US008712052B2

(12) United States Patent
Landheer

(10) Patent No.: US 8,712,052 B2
(45) Date of Patent: Apr. 29, 2014

(54) SYSTEM AND METHOD FOR SECURE POWER SYSTEMS INFRASTRUCTURE COMMUNICATIONS

(75) Inventor: Ronald Landheer, Quebec (CA)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/555,730

(22) Filed: Jul. 23, 2012

(65) Prior Publication Data

US 2014/0023193 A1    Jan. 23, 2014

(51) Int. Cl.
*H04L 9/00*    (2006.01)
(52) U.S. Cl.
USPC ............................ 380/255; 380/263; 713/189
(58) Field of Classification Search
USPC ............................ 380/268, 255, 263; 713/189
See application file for complete search history.

(56) References Cited

U.S. PATENT DOCUMENTS

| | | | | |
|---|---|---|---|---|
| 5,335,280 | A * | 8/1994 | Vobach | ............................ 380/42 |
| 5,533,128 | A | 7/1996 | Vobach | |
| 6,049,614 | A * | 4/2000 | Kim | ............................... 380/263 |
| 7,133,525 | B1 * | 11/2006 | DeGregorio et al. | ........... 380/244 |
| 7,480,687 | B2 | 1/2009 | Dirscherl et al. | |
| 7,680,273 | B2 | 3/2010 | Whitehead et al. | |
| 7,725,595 | B1 | 5/2010 | Geissler et al. | |
| 7,852,409 | B2 | 12/2010 | Gomila et al. | |
| 2006/0114988 | A1 | 6/2006 | Gomila et al. | |
| 2006/0126833 | A1 | 6/2006 | O'Leary et al. | |
| 2008/0016489 | A1 | 1/2008 | McMillan et al. | |
| 2008/0063185 | A1 * | 3/2008 | Alpcan et al. | .................... 380/28 |
| 2009/0252326 | A1 | 10/2009 | Buchmann et al. | |
| 2010/0033305 | A1 | 2/2010 | Korgaonkar et al. | |
| 2012/0033804 | A1 | 2/2012 | Soquet | |

OTHER PUBLICATIONS

Rivest, Ronald L., "Chaffing and Winnowing: Confidentiality without Encryption," dated Apr. 24, 1998, 6 pages.
http://en.wikipedia.org/wiki/Electric_power_system, 2013, 11 pages.
http://en.wikipedia.org/wiki/Chaffing_and_winnowing, 2013, 3 pages.
Tschudin, Christian F., "Header Hopping and Packet Mixers," In: Computer Communications and Networks, 9th International Conference, 2000.
PCT Application No. PCT/US2013/049902, PCT Search Report dated Oct. 29, 2013.

* cited by examiner

*Primary Examiner* — Matthew Smithers
(74) *Attorney, Agent, or Firm* — Patterson Thuente Pedersen, P.A.

(57) ABSTRACT

Communication apparatus and associated method for sending messages while concealing the messages among chaff data. In sending outgoing communications to and from a remote device, a stream of chaffing data is generated. A message to be communicated is inserted into the stream of chaffing data such that the beginning and ending boundaries of the first message are concealed by the chaffing data. A matching pair of deterministic number generators, one at the sending end and one at the remote device, are initialized using a common initialization value to cause generation of a common sequence of numbers with the remote device. The stream of chaffing data, or data associated with the first message, or both, are encoded with the common sequence of numbers.

48 Claims, 17 Drawing Sheets

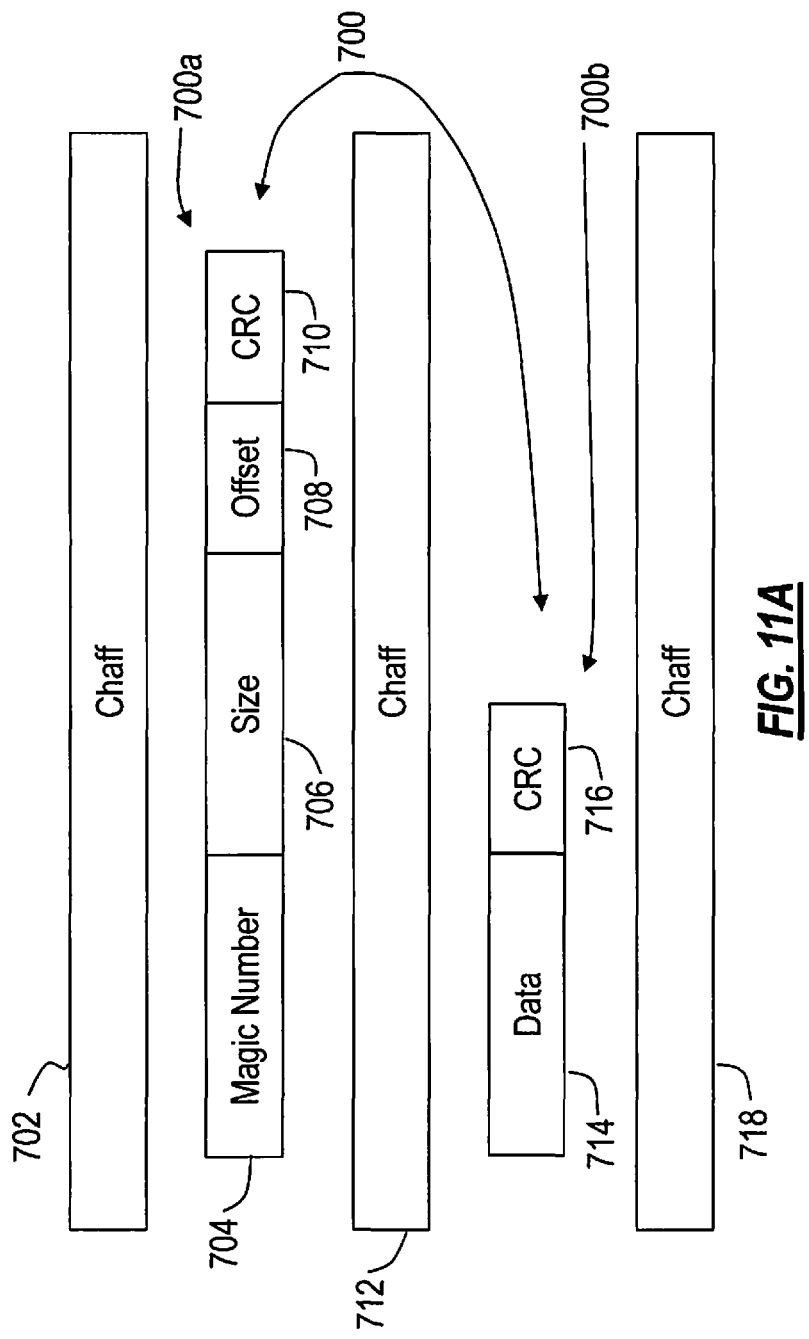

SYSTEM AND METHOD FOR SECURE POWER SYSTEMS INFRASTRUCTURE COMMUNICATIONS

FIELD OF THE INVENTION

The invention relates generally to power systems management and, more particularly, to data security in communication links between power system infrastructure devices.

BACKGROUND OF THE INVENTION

An electric power system is a network of electrical components used to supply, transmit and use electric power. An example of an electric power system is the network that supplies a region's homes and industry with power—for sizable regions, this power system is known as the grid and can be broadly divided into the generators that supply the power, the transmission system that carries the power from the generating centers to the load centers and the distribution system that feeds the power to nearby homes and industries. Smaller power systems are also found in industry, hospitals, commercial buildings and homes.

A power distribution system includes a variety of geographically-distributed power system devices (PSDs) forming the backbone of the power system. Oftentimes, a supervisory control and data acquisition (SCADA) system is employed, utilizing distribution components such as remote terminal units (RTUs), digital fault recorders (DFRs), intelligent electronic devices (IEDs), programmable logic controllers (PLCs), and the like.

Any of these PSDs can be configured to communicate with one or more other PSDs over a communication link, wired or wireless, such as over a wide area network (WAN), point-to-point or multi-hop radio frequency (RF) link, which may be in a licensed or unlicensed band, depending on system requirements and local regulations of the RF spectrum. Wired communications are conducted over a variety of mediums, for example, power lines, packet switched telephone networks (PSTN), T-carrier, fiber optics, etc., and may be sent over a network of interconnected devices such as the Internet, or a private network, Radio communications are typically handled by two-way radio systems, which may be half-duplex (in which only one device from a communicating pair of devices transmits at a given time), or full-duplex (in which both devices of a communicating pair can transmit data concurrently to be received by the other device).

Whether wired or wireless, the communications between PSDs are susceptible to eavesdropping or tampering. Historically, communications between PSDs have been designed with emphasis primarily on reliability. Originally, system designers were less concerned about the possibility of unauthorized third persons listening in on power system management data, let alone purposefully interfering with those communications. Over time, it became apparent that power distribution systems can be susceptible to various threats, whether from mischief akin to simple vandalism, more sophisticated attacks from criminal groups seeking to interfere with power systems for any one of a variety of unlawful purposes, e.g., "hacktivism," ransom extortions, etc., or even from hostile nations aiming to attack national infrastructure by wreaking havoc with essential services to homes and businesses. Accordingly, power system designers have looked for different approaches in an effort to provide enhanced security to radio communications between PSDs.

There are myriad known solutions for improving security of communications from intrusions such as eavesdropping, jamming, and manipulation of data by third parties. One well-known approach is the use of data encryption to obfuscate the information being communicated. Many encryption techniques are well-known, such as a symmetric key (e.g., stream cipher, block cipher, etc.), or asymmetric keys (e.g., public key cryptography or digital signature).

Conventional encryption techniques are susceptible to attacks in which an eavesdropper monitors ongoing communications for a sufficient period of time to discern characteristic patterns which can then be exploited to break the code. One solution to mitigate this susceptibility is the use of steganography, concealing the existence of a transmission from all but the sender and intended recipient of the message. Whereas cryptography protects the contents of a message, steganography is regarded as protecting both messages and communicating parties. Typically, the message is embedded within a seemingly unrelated cover message using an algorithm known only to the sender and recipient, thereby concealing the existence of the message.

Another related conventional cryptographic technique for concealing a message without the requirement for encryption is known as chaffing and winnowing. Chaffing is a process, performed by a sender, of burying the message to be transmitted within a stream of bogus data referred to as the chaff, generally by interleaving parts of the message with random data. This technique relies upon the use of a secret message authentication code (MAC) shared between the sender and recipient that is needed to discern the message (i.e., separating the wheat from the chaff). The MAC is used to identify portions of the message from within the stream of the bogus data in a process termed winnowing, which is performed by the recipient of the message.

One problem with the above-identified techniques is exchanging keys, MACs, or other secret information between the sender and receiver in a secure way (i.e., avoiding an unsecure communication channel that might be eavesdropped on during the key exchange). These shared secrets are typically exchanged in an out-of-band communication. In this context, the term out-of-band refers to utilizing a separate channel, or an entirely different mode of communication that is different from the primary channels on which the message is communicated between the sender and recipient devices, and one that is preferably not susceptible to being eavesdropped on or interfered with.

Variations of the chaffing and winnowing technique have been proposed as a steganography method. For instance, in U.S. Pub. No. 2010/0033305, chaffing and winnowing without the use of a MAC is proposed for steganographic purposes. In this approach, "noise" is inserted into the communication channels with the data transmissions by the sender of the data, by one or more additional noise transmitters, or by the recipient. If the recipient is not the generator of the noise, data regarding the noise must be conveyed to the recipient over a secure or dedicated communication link; the recipient then uses the data regarding the noise to perform the winnowing. In another approach, the sender and recipient communicate the message over a pre-arranged sequence of channels (time, frequency, orthogonal codes). Still, in all of these cases, the recipient must obtain knowledge about the noise, which requires an out-of-band conveyance of that knowledge.

Specialized out-of-band communications are often impractical in power systems, where new PSDs may be added and expected to self-configure to work with an already deployed system of PSDs. A public key infrastructure with certificate authorities to support the use of digital signatures is oftentimes impractical in power systems, and PSDs may not have the processing or communication capacity to handle such encryption or protocol. Also, the use of asymmetrical encryption, as in public key cryptosystems, and the use of Diffie-Hellman-type key exchange protocols, require a high level of computing power which may not be available in already-deployed PSDs that are to be upgraded to support increased security.

A practical solution is therefore needed to support secure communications in power systems while avoiding some or all of the above-identified challenges.

SUMMARY OF THE INVENTION

Aspects of the invention are directed to communication apparatus and associated methods for sending messages while concealing the messages among chaff data. In sending outgoing communications to and from a remote device, a stream of chaffing data is generated. A message to be communicated is inserted into the stream of chaffing data such that the beginning and ending boundaries of the first message are concealed by the chaffing data. A matching pair of deterministic number generators, one at the sending end and one at the remote device, are initialized using a common initialization value to cause generation of a common sequence of numbers with the remote device. The stream of chaffing data, or data associated with the first message, or both, are encoded with the common sequence of numbers.

According to one particular aspect of the invention, a communication apparatus for sending messages over a communication medium and to conceal the messages among chaff data is provided. In the apparatus, an input circuit is adapted to obtain a first message that is to be transmitted. The first message could have been generated by a message originator circuit, such as an output from a power system device, for example; or, the first message could have been generated by a module of the apparatus itself. The apparatus includes a communication circuit adapted to send outgoing communications and receive incoming communications data over one or more channels through the communication medium, respectively, to and from a remote device. A chaffing module in the apparatus is adapted to generate a stream of chaffing data, and a message insertion module that is operatively coupled to the input circuit, the chaffing module, and the communication circuit, is configured to insert the first message into the stream of chaffing data such that the beginning and ending boundaries of the first message are concealed by the chaffing data.

A first deterministic number generator module (DNGM) in the apparatus, such as a pseudorandom number generator, for example, is adapted to generate different sequences of numbers based on different initialization values such that, in response to each initialization value, a certain sequence of numbers is repeatably generated. The apparatus includes a DNGM initialization module operatively coupled to the communication circuit and to the first DNGM, and adapted to exchange initialization data via the communication circuit with the remote device to establish a common initialization value between the first DNGM and a second DNGM of the remote device to thereby cause the first DNGM and second DNGM to generate a common sequence of numbers. Either the stream of chaffing data, or data associated with the first message, or both, are encoded using an output of the first DNGM when the first DNGM and the second DNGM are generating the common sequence of numbers.

In a related aspect, a communication apparatus such as the one described above includes a winnower module operatively coupled to the communication circuit and to the first DNGM, the winnower module being adapted to distinguish between chaffing data and message data in the incoming communications data, by determining the beginning and ending boundaries of the first message based on detecting at least one of the stream of chaffing data and data associated with the first message in the incoming communications data using an output of the first DNGM when the first DNGM is and the second DNGM are generating the common sequence of numbers. The apparatus further includes an output circuit adapted to provide the incoming message to a message consumer circuit, such as to an interface port of the power system device, for example.

A method for sending messages, by a communication device, over a communication medium while concealing the messages among chaff data according to another aspect of the invention includes a process of: obtaining a first message that is to be transmitted; sending outgoing communications over one or more channels through the communication medium to and from a remote device; generating a stream of chaffing data; inserting the first message into the stream of chaffing data such that the beginning and ending boundaries of the first message are concealed by the chaffing data; generating different sequences of numbers based on different initialization values such that, in response to each initialization value, a certain sequence of numbers is repeatably generated; exchanging initialization data with the remote device to establish a common initialization value with the remote device to thereby cause generation of a common sequence of numbers with the remote device; and encoding at least one of the stream of chaffing data and data associated with the first message and the common sequence of numbers.

A number of variations and optional features are detailed below in additional embodiments.

BRIEF DESCRIPTION OF THE DRAWINGS

The invention may be more completely understood in consideration of the following detailed description of various embodiments of the invention in connection with the accompanying drawings, in which:

FIG. 11A is a diagram illustrating an exemplary format of chaff and messages inserted in the chaff according to one type of embodiment.

Figure 1A:
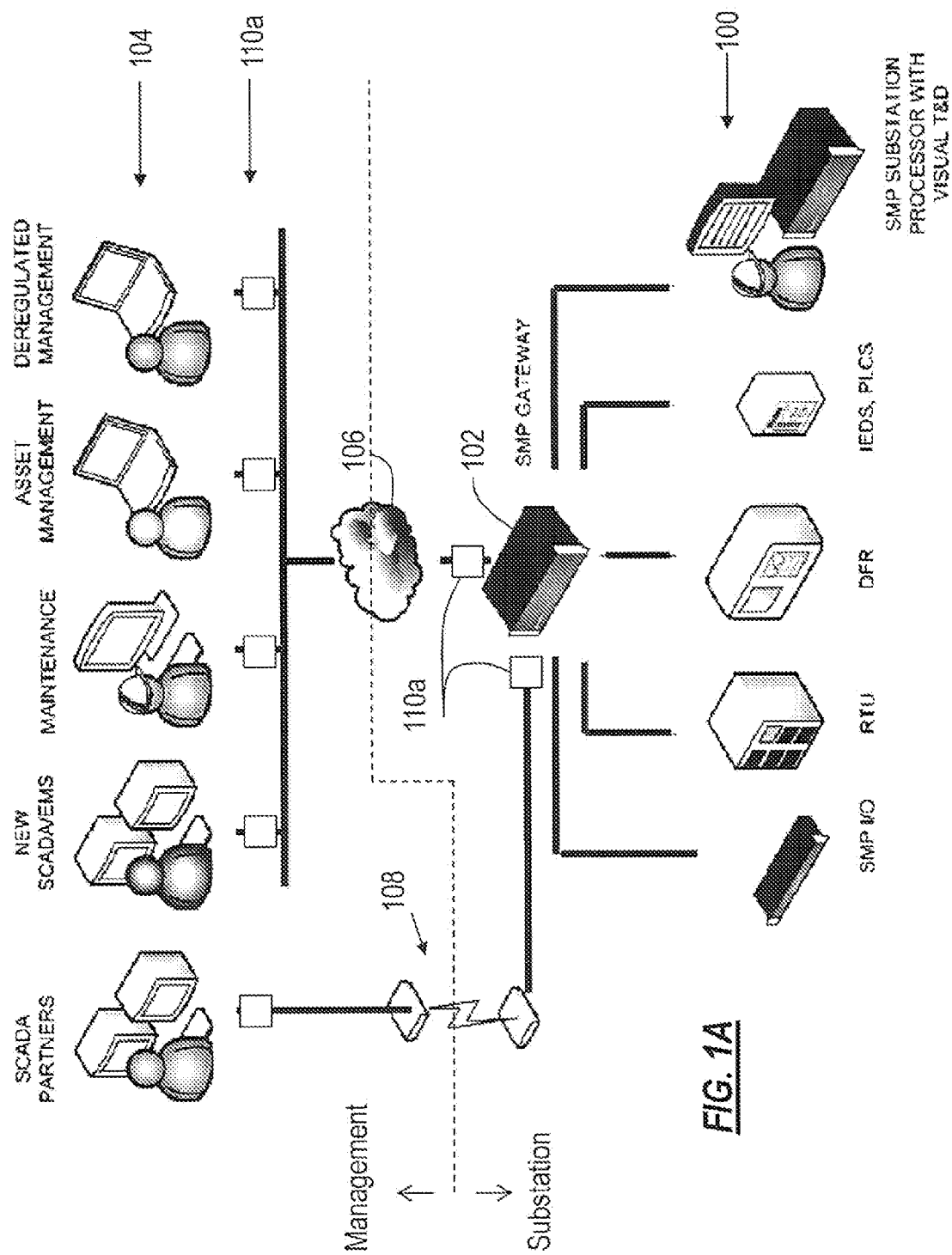
FIGS. 1A-1C are system block diagrams illustrating the various components in a power system communications environment, in which aspects of the invention can be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to improving the security of communicated data over a communication channel. The specific embodiments of the invention described below are presented in the context of a power system. However, the principles of the invention may be applicable in any application using point-to-point, and even point-to-multipoint, communications over a wired or wireless medium.

Figure 1B:
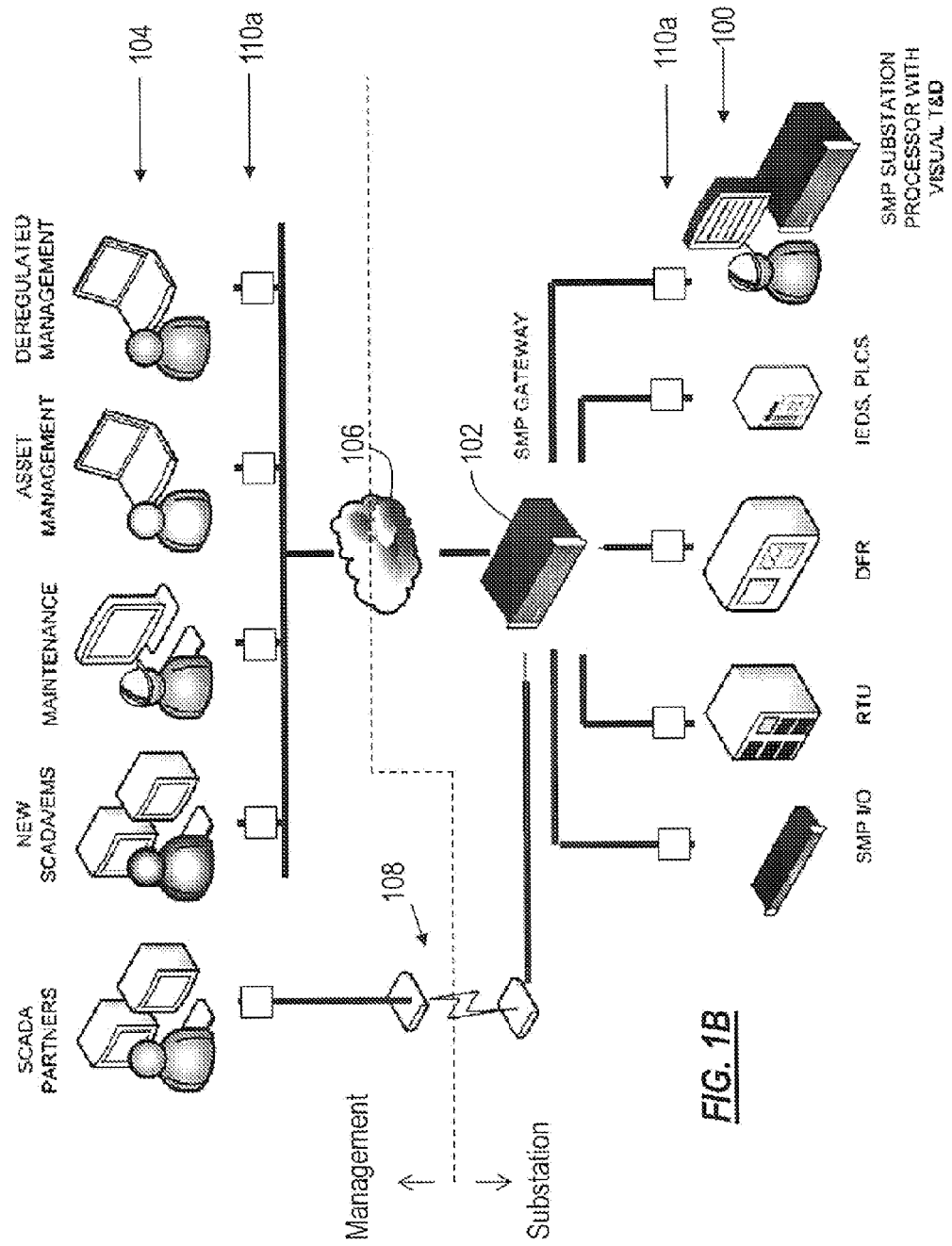
Figure 1C:
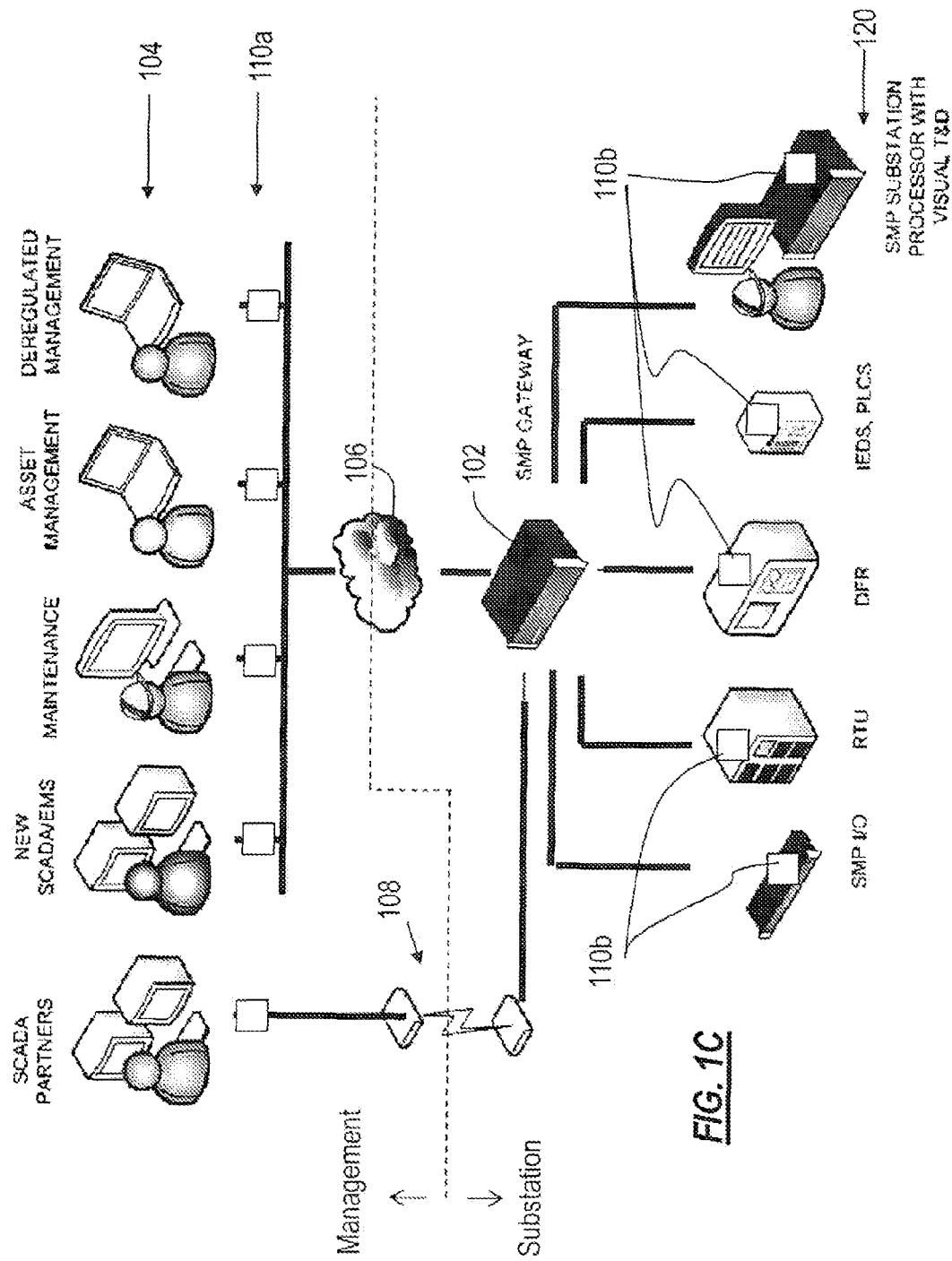

Turning now to the figures, FIGS. 1A-1C are system block diagrams illustrating the various components in a power system communications environment. As depicted, various power system devices (PSDs) 100 are situated at a substation. For example, a substation modernization platform (SMP) device, a remote terminal unit (RTU), a digital fault recorder (DFR), intelligent electronic devices (IEDs), programmable logic controllers (PLCs), and a SMP substation processor. These various PSDs 100 are communicatively coupled, typically via short-distance serial connection (e.g., RS-232 and the like) or, in more recent systems, local area network (LAN), to a SMP gateway device 102, which connects over a wide area network (WAN) 106 or over a dedicated link 108, to various management side devices 104.

The arrangement in FIG. 1A includes a set of communication security devices 110a on both sides of the WAN 106 or dedicated link 108 to protect against eavesdropping and hacking targeting the communications passing through the WAN 106 and dedicated link 108. In the arrangement of FIG. 1B, communication security devices 110a are situated at the communication link nearest each of substation devices 100. This arrangement protects against attacks targeting the substation LAN itself. Notably, in certain embodiments, communication security devices 110a operate at a high abstraction layer, such as at the application layer or presentation layer, thereby retaining seamless compatibility with the workings of the other network devices, such as SMP gateway 102, and other routing devices, through which communications pass.

In FIG. 1C, similar communication security devices 110b are integrated in the communications circuitry and functionality of PSDs 120, which are in all other respects similar to PSDs 100. Other embodiments are contemplated in which part of the functionality of communication security devices 110a or 110b is distributed among PSDs 100, 120, and separate devices.

Figure 2:
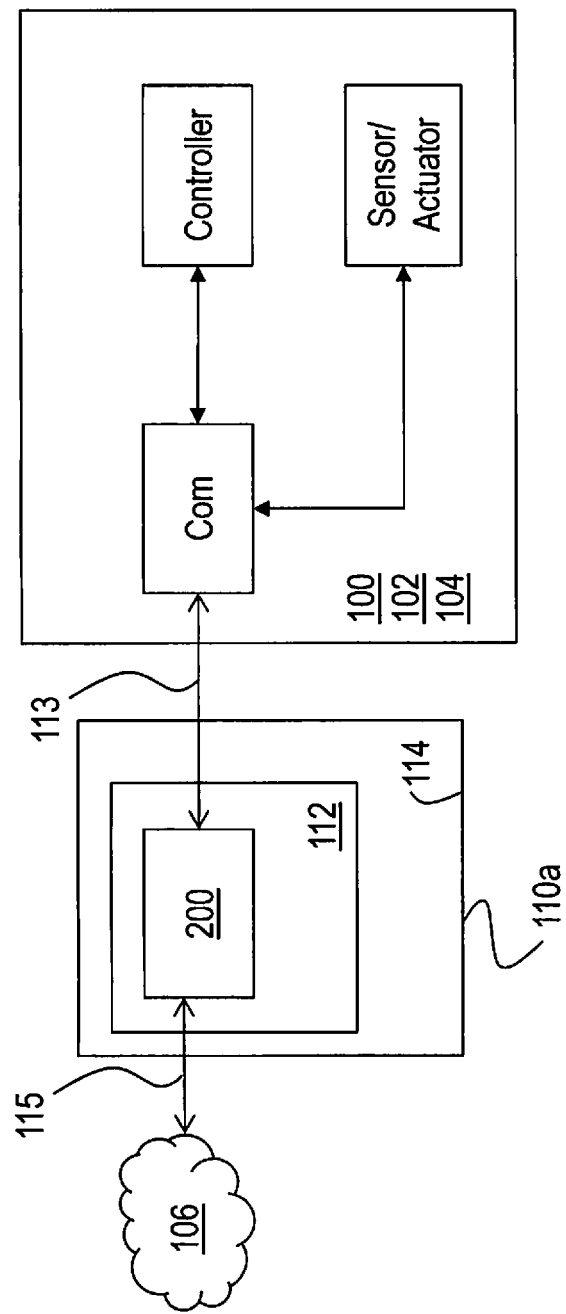
FIG. 2 is a block diagram illustrating an exemplary arrangement of a communication security device interfaced with a power system device according to one type of embodiment.

FIG. 2 is a block diagram illustrating an exemplary arrangement of communication security device 110a, interfaced with a PSD such as PSD 100, 102, or 104, which can include a sensor or actuator, a controller, and a communications circuit. Communication security device 110a includes electronic hardware 112, such as computing circuitry, communications circuitry, power supply circuitry, etc., and a housing 114. Electronic circuitry 112 is configured to implement a specialized communication module 200, which communicates with PSD 100, 102, 104 using ordinary local communications 113, i.e., using the protocol with which the PSD is nominally configured. Examples of this ordinary local connection 113 include an Ethernet connection, token ring (IEEE 802.5), a serial port connection such as RS-232, RS-485, or the like, small computer systems interconnect (SCSI), universal serial bus (USB), IEEE-1394 ("Firewire"), Inter-Integrated Circuit (I$^2$C), and the like. The ordinary connection is generally a short-range, point-to-point connection, though many of these interconnection standards can support multiple devices. Communication module 200 communicates via secured connection 115 on the WAN 106 side using the increased security that communication module 200 facilitates.

The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose devices that execute an operating system, system programs, and application programs, while also implementing the module using multitasking, multithreading, distributed (e.g., cloud) processing, or other such techniques. In still other implementations, a module can be implemented as part of an embedded system with more specialized functionality, though not necessarily limited to the functionality of certain modules. Accordingly, each module can be realized in a variety of suitable configurations, and should not be limited to any particular implementation exemplified herein.

Figure 3:
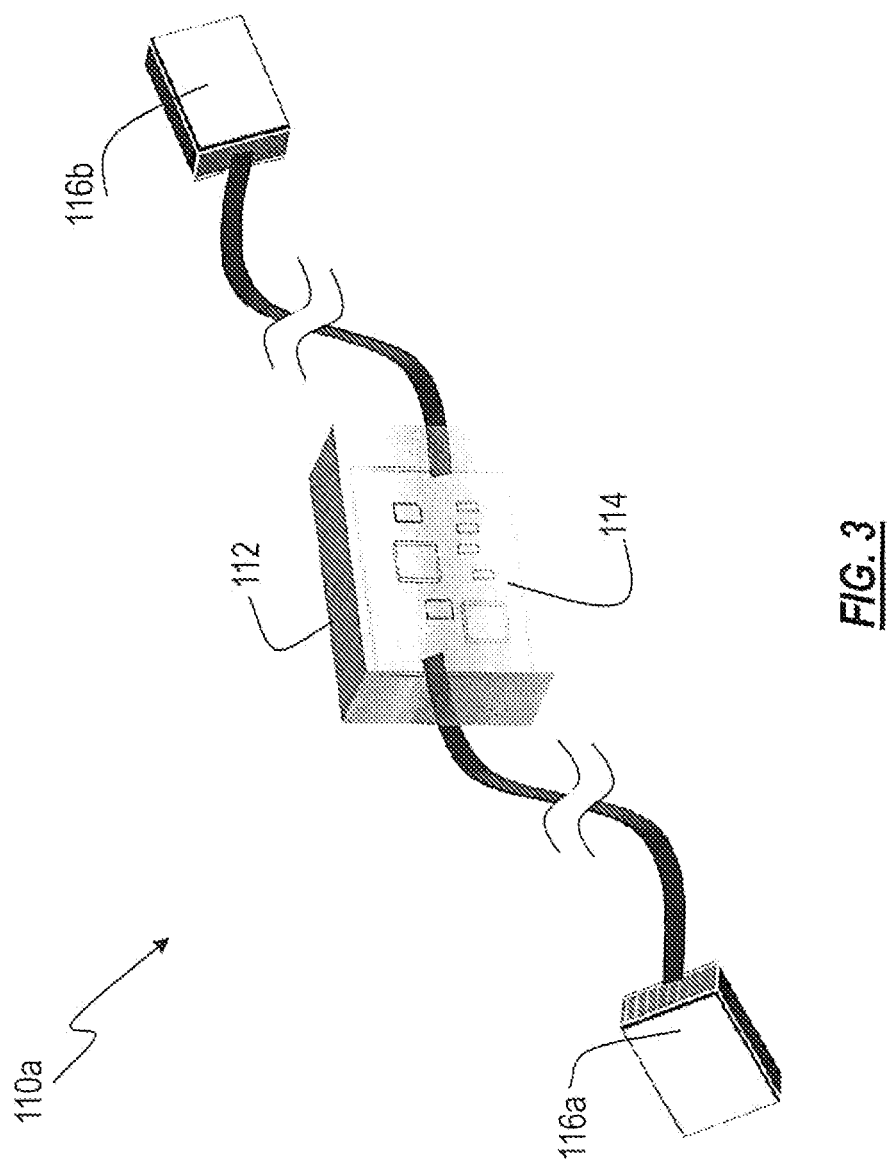
FIG. 3 is a block diagram illustrating a specific implementation of communication security device in which the device is constructed as a "bump-in-the-wire" accessory according to an embodiment of the invention.

FIG. 3 is a block diagram illustrating a specific implementation of communication security device 110a in which the device is constructed as a "bump-in-the-wire" accessory according to one embodiment. In this embodiment, device 110a includes a relatively small housing 112 that encloses electronic circuitry 114, and includes communication port interfaces 116a and 116b, one of which connects to a local PSD, and the other to the LAN side or WAN side of the network. In a related embodiment, device 110a is powered via the interconnect (such as by the PSD), thereby eliminating the need for a separate power supply and dedicated connections thereto.

Figure 4:
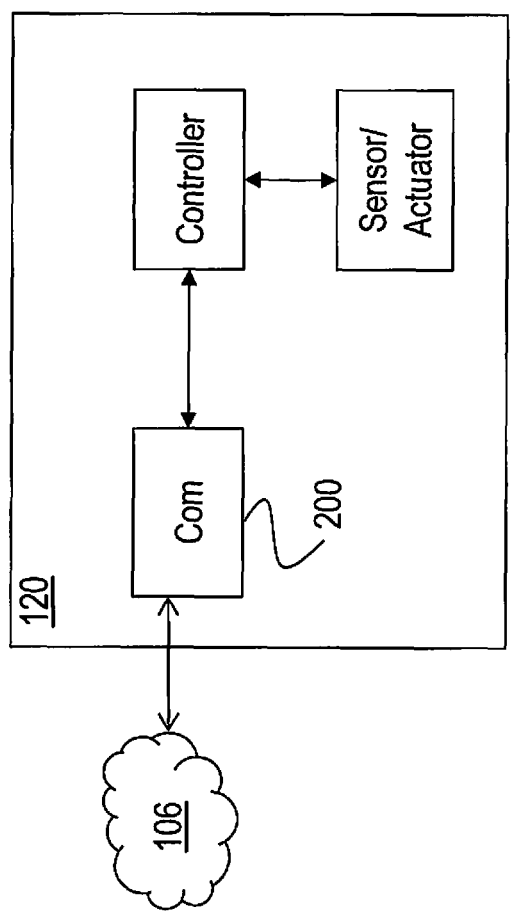
FIG. 4 is a block diagram illustrating an integration of communication module in a power system device according to a related embodiment.

FIG. 4 is a block diagram illustrating an integration of communication module 200 in PSD 120. Here, communication module 200 has the role of the communications circuit of the PSD 120. The communicative connection with the controller of PSD 120 is internal to PSD 120, i.e., via the system bus, backplane, or other internal wiring arrangement.

Figure 5:
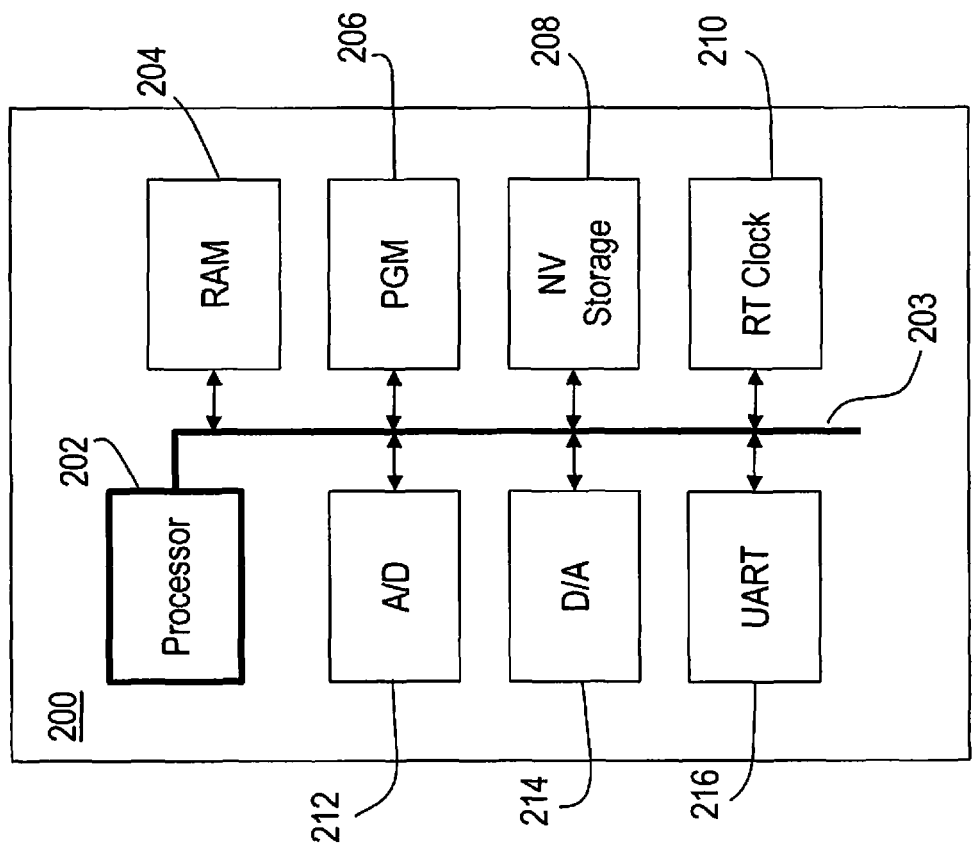
FIG. 5 is a diagram illustrating some exemplary hardware components with which a communication module according to one type of embodiment can be implemented.

FIG. 5 is a diagram illustrating some exemplary hardware components with which module 200 is implemented. Processor 202 is interconnected with the other components shown via system bus 203. Processor 202 can be implemented as a microprocessor system using any suitable architecture (e.g., RISC, CISC, DSP, etc.), and may be integrated as a monolithic circuit with various other components in a microcontroller arrangement. RAM 204 provides scratchpad memory used by the processor. Program memory 206 contains the program instructions executed by processor 202, and can be either an allocated space in RAM 204, or a separated memory device such as a read-only memory. Non-volatile storage 208 can be implemented as a disk, electrically-erasable read-only memory (EEPROM) such as a flash EEPROM, etc. This device is used to store program instructions in the absence of a dedicated ROM, and can also store operational and historic data, configuration information, etc. Real-time clock 210 provides timekeeping functionality and is typically implemented as a separate integrated circuit with an independent power source such as a long-life battery.

Communication module 200 can also include interface circuitry such as, for instance analog-to-digital convertor 212, digital-to-analog converter 214, and universal asynchronous receiver transmitter (UART) 216 which facilitates serial communications. In certain embodiments, the hardware of module 200 also includes line driver circuitry, radio transceiver circuitry, and the like.

Figure 6:
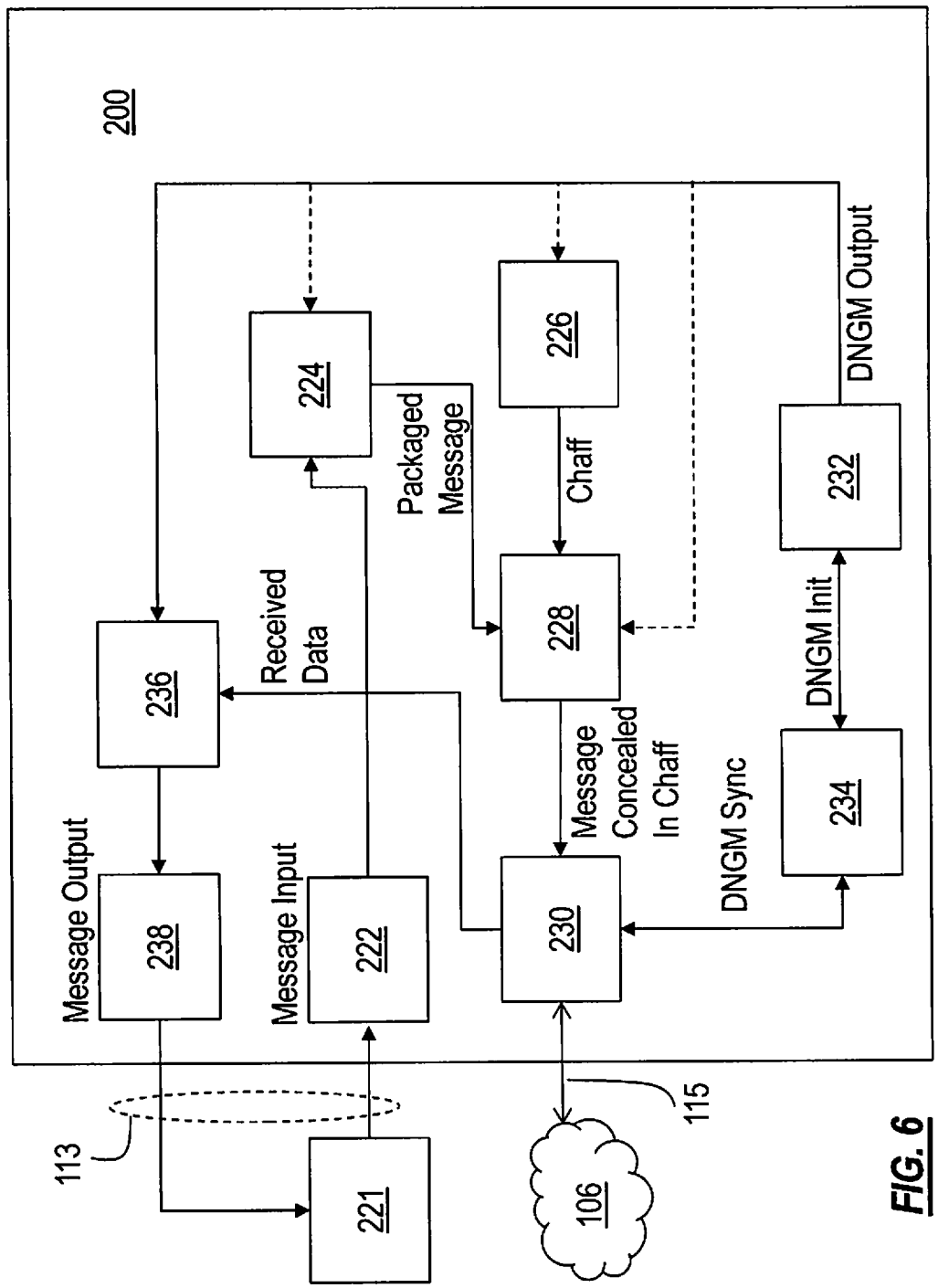
FIG. 6 is a block diagram illustrating specialized modules that provide the various functionality of a communication module according to one type of embodiment.

FIG. 6 is a block diagram illustrating specialized modules that provide the various functionality of communication module 200 according to one type of embodiment. Ordinary local connection 113 between communication module 200 and a message originator and consumer 221 of the PSD is supported by a message input 222, and message output 238 which can include signal conditioning circuitry as needed to ensure reliable signal transmission and reception, standard port hardware and protocols, hardware circuitry on which data structures such as a first-in-first-out (FIFO) buffer, shift register, and the like, can be implemented. Message input 222 is configured to obtain messages to be transmitted with increased security. Message originator and consumer 221 is that part of the PSD that generates messages to be transmitted to another PSD, and receives messages generated elsewhere as a final destination point for those messages. Typically the message originator and consumer 221 comprises a controller circuit and associated data structures and instruction code of the local PSD.

The messages themselves at this stage can be in plaintext (i.e., non-encrypted), or they may have one or more layers of security applied. Even if the messages are encoded in some fashion at this point, it is presumed that the security is insufficient, thereby necessitating the additional functionality provided by communication module 200. The messages to be transmitted are provided to message packaging module 224, which packetizes the messages, and optionally encodes the messages for increased security.

According to aspects of the invention, the messages are further concealed among chaff data. Chaff data is data that has no particular significance to the substance of the communications. Rather, the chaff data is utilized to conceal the starting and ending boundaries of each of the messages to be transmitted. In related embodiments, the chaff data can have the appearance of random data, or the chaff data can have similar statistical distribution to actual message data so that even a sophisticated eavesdropper, without key information for discerning the messages from the chaff, would find it computationally very difficult to extract, or "winnow," the messages, or "wheat," from the chaff.

The chaff data is generated by chaffing module 226, which is configured to generate a stream of chaff data of sufficient length that the sequence is not repeated within a defined time window. In one embodiment, the chaff data is generated by a random number generator, or in some other fashion such that the chaff is unpredictable. In another embodiment, the chaff is generated in such a way that it appears to be unpredictable or random, but in fact is predictable.

Message insertion module 228 combines the chaff with the packaged message. In one embodiment, the combining involves replacing a portion of the stream of chaff with the packaged message such that the message boundaries are obfuscated. In another embodiment, the chaff and message are combined bit-wise by modulo-2 addition, i.e., XOR operation.

The message concealed in the chaff is passed to communication circuit 230 for transmission to the WAN 106 via secure connection 115. Communication circuit 230 is constructed to communicate over a wired or wireless communications medium according to various embodiments. Communications may be full-duplex or half-duplex based on the protocol employed for communications over the network. The transmission may be over one, or multiple channels. The operation of communication circuit is generally handled by the lower layers such as the transport layer, network layer, data link layer, and physical layer.

Communication module further includes a deterministic number generator module (DNGM) 232, which is adapted to generate different sequences of numbers based on different initialization values such that, in response to each initialization value, a certain sequence of numbers is repeatably generated. In one type of embodiment, a pseudorandom number generator (PRNG) is utilized as the DNGM, though strictly speaking, other algorithms that do not meet a particular definition of a true PRNG, may also be used, provided that they provide a sequence of numbers that is repeatably generated from the same seed value. Any suitable PRNG algorithm may be utilized based on the required degree of security. For instance, for more highly secure systems, a cryptographically secure PRNG can be used. In other systems, a more basic algorithm can be employed.

DNGM 232 is used in one type of embodiment to generate the chaffing data. In another embodiment, DNGM 232 is used to encode the messages as part of the packaging. In another related embodiment, DNGM 232 is used for both, chaff generation, and message encoding. Importantly, the use of a DNGM at the transmission side and the reception side permits the chaff, the encoded message, or both, to be recognized by the receiver. For this to be possible, the DNGM at the sender side and at the receiver side must be synchronized. Synchronized in this sense does not require perfect time-wise synchronization. Rather, synchronization in the present context means that the DNGM in the receiver is able to generate the same sequence of numbers as the DNGM in the sender. The receiver may generate its sequence at some later point in time, though in other embodiments the sender and receiver are generating the same sequence in near-real time. Thus, it can be said that as a result of the synchronization of a first and a second DNGM, the first DNGM and the second DNGM each obtains a capability to identify a DNGM sequence of numbers generated by the other DNGM in the past, present, or future. In order for synchronization to be achieved, the DNGM of the sender and the DNGM of the receiver must first use the same deterministic number generation algorithm, and second, they both must use the same seed, or initialization, value for their respective DNGMs.

Although sender and receiver devices can be configured a priori with preset DNGM algorithms and seed values, such preconfiguration presents a critical security weakness in that a discovered seed value and algorithm by an attacker would enable the attacker to eavesdrop virtually at will. Embodiments of the present invention provide an efficient means for the sender and receiver to exchange information that enables them to arrive at the same seed value, without directly exchanging the seed value itself. This advantageously avoids having to use an off-line communication to exchange the secret information. The synchronization is carried out by DNGM initialization module 234, which generates specialized communications to exchange critical information with the peer PSD, and utilizes communication circuit 230 to handle the actual communications functionality for the initialization-related data exchanges.

Data received via communication circuit 230 is passed to winnower module 236, which is configured to distinguish between chaff and messages, if any, contained therein. Winnower module 236 relies on the output of DNGM 232, which must be synchronized with the DNGM of the sender device in order for winnowing to be effective. According to various embodiments, there are three regimes by which a sender-receiver pair of devices can conceal and recover messages in their communications.

According to one type of embodiment, messages are discerned from chaff by the winnower module 236 locally generating a copy of the chaff used to conceal the message, and then identifying data that is non-chaff as a potential message. The message itself may or may not be encoded according to various related embodiments. According to the approach of this embodiment, the chaff is generated by the sender device in such a way that it can be predicted by winnower module 236 based on the local DNGM at the receiving side. In a related embodiment, the messages are further identified by an identifier number so that data which is non-chaff can quickly be recognized as a message, as distinguished from noise or data with errors.

According to a related type of embodiment, messages are discerned from chaff by the winnower module 236 locally generating the code used to encode the message, and recognizing data as a message based on a distinguishing characteristic used for messages, such as a message identifier number. According to this approach, the messages packaged by the sender device are encoded based on the DNGM output, such that a synchronized DNGM at the receiver device can be used to decode the data received. Data that is not recognized as belonging to a message is deemed chaff and discarded. This approach does not require the chaff to be predictable.

Another related type of embodiment utilizes a combined approach, in which both, the chaff, and the message, are encoded based on the DNGM output, and are each separately recognizable by winnower module 236.

Messages extracted by winnower module 236 are passed to message output 238 to be delivered to message consumer 221 of the local PSD.

In the embodiment depicted in FIG. 6, communication module 200 operates as a receiver of messages embedded in chaff in addition to operating as a transmitter of such messages. According to other embodiments contemplated, dedicated transmission devices, and dedicated reception devices may be employed for PSDs that do not participate in full two-way command and control modes of operation. For instance, a simple sensor device may only need to send messages, and not receive them. Likewise, a reporting system that does not participate in control of other PSDs may only need to receive information. For each of these cases, modules involved solely for a function not needed may be omitted. For example, the chaffing module 226 and message insertion module 228 may be entirely omitted in a receive-only embodiment.

Figure 7:
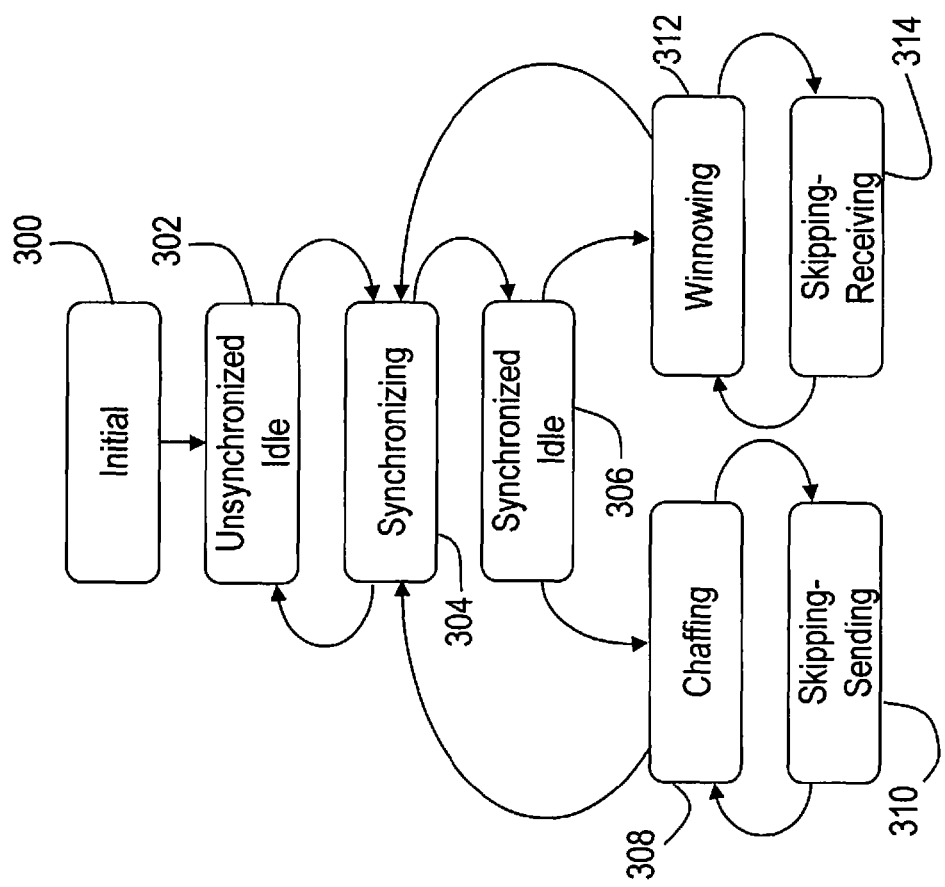
FIG. 7 is a state diagram illustrating various operational states of the communication module of FIG. 6 according to one embodiment.

FIG. 7 is a state diagram illustrating various operational states of communication module 200 according to one embodiment. Initial state 300 is a state in which module 200 allocates the necessary resources for its operation and may synchronize its clock with a third source (e.g. using a GPS or IRIG-B signal) and from which it will transition to the unsynchronized-idle state 302 once all the necessary initializations have taken place. The unsynchronized-idle is where module 200 may remain until there is a need to send data to, or in response to reception of data from another PSD, at which point it will transition to the synchronizing state 304.

In synchronizing state 304 communication module performs a process of synchronizing its DNGM with the other PSD. In the synchronized-idle state 306, communication module 200 neither sends nor receives data. The device may remain in this state until either the PSD has data to send (which may already be true when entering this state, and in which case it will transition to the chaffing state 308) or the PSD has received data from its peer (which may also already be the case when entering this state, and in which case it will transition to the winnowing state 312).

In a related embodiment, upon returning to synchronizing state 304 from either chaffing state 308 or winnowing state 312, the seed, or initialization value for the DNGM is updated. This can happen on every return to the synchronizing state 304, or upon a return to synchronizing state 304 if certain conditions are met, such as the $n^{th}$ return to state 304, where n is some predefined quantity, e.g., 5. Similarly, the seed updating can take place upon a return to synchronizing states 304 given the passage of a predefined amount of time, e.g., 2 minutes. Likewise, the seed can be updated in response to a return to synchronizing state 304 provided a certain type of message was exchanged.

The seed can be updated based on a new synchronization routine according to one approach. In another approach, the seed is updated independently by each peer device to the same new seed value based on a value known to both devices. For example, the DNGM can be re-initialized using the most recent cyclical redundancy check (CRC) value, or based on some combination of data from a plurality of recently-exchanged messages. This dynamic updating of the seed value makes it more difficult for an eavesdropper who is familiar with the security protocol to discern the current code being used to obfuscate the data or message boundaries. Also, this approach avoids having to conduct out-of-band exchanges of secret data such as key exchanges. In a related embodiment, the DNGMs of a communicating pair of peer devices are re-initialized at a point other than in a return to synchronization state 304. For instance, the re-initializing can occur in response to returning from skipping-sending state 310 for the first device and skipping-receiving state 314 for the second device, to chaffing state 308 and winnowing state 312, respectively.

In chaffing state 308 communication module 200 produces chaff data, either based on its DNGM, or on some other source of data such as a random number generator, or other algorithm. In a related embodiment, the amount of chaff sent is variable and unpredictable, even though the content of the chaff itself is predictable. Communication module 200 can enter the chaffing state at any time, including in response to a random call to do so. In a related embodiment, communication module 200 spends a majority of its time in chaffing state 308. For instance, the device can spend 80% or more of its non-receiving time in chaffing state 308.

In a related embodiment, where full-duplex communications are used, a pair of communicating devices can each be in the chaffing state 308, and winnowing state 312 simultaneously. Similarly, in a variation of this type of embodiment, each communication module 200 includes a pair of DNGMs with one DNGM dedicated to the receiving and winnowing functionality, and the other DNGM dedicated to transmitting and chaffing functionality.

Skipping-sending state 310 is where communication module 200 inserts message data into the stream of chaff when there is data to send. The insertion of the message data may occur at random intervals to accommodate the variable amount of chaff between (or before and after) messages.

In winnowing state 312, communication module 200 receives a stream of data and processes that received data to detect messages, if any, from among the chaff. In response to a detection of a message, communication module 200 proceeds to skipping-receiving state 314, in which it parses the message-bearing data to extract the message content to be passed on to the message consumer.

Figure 8:
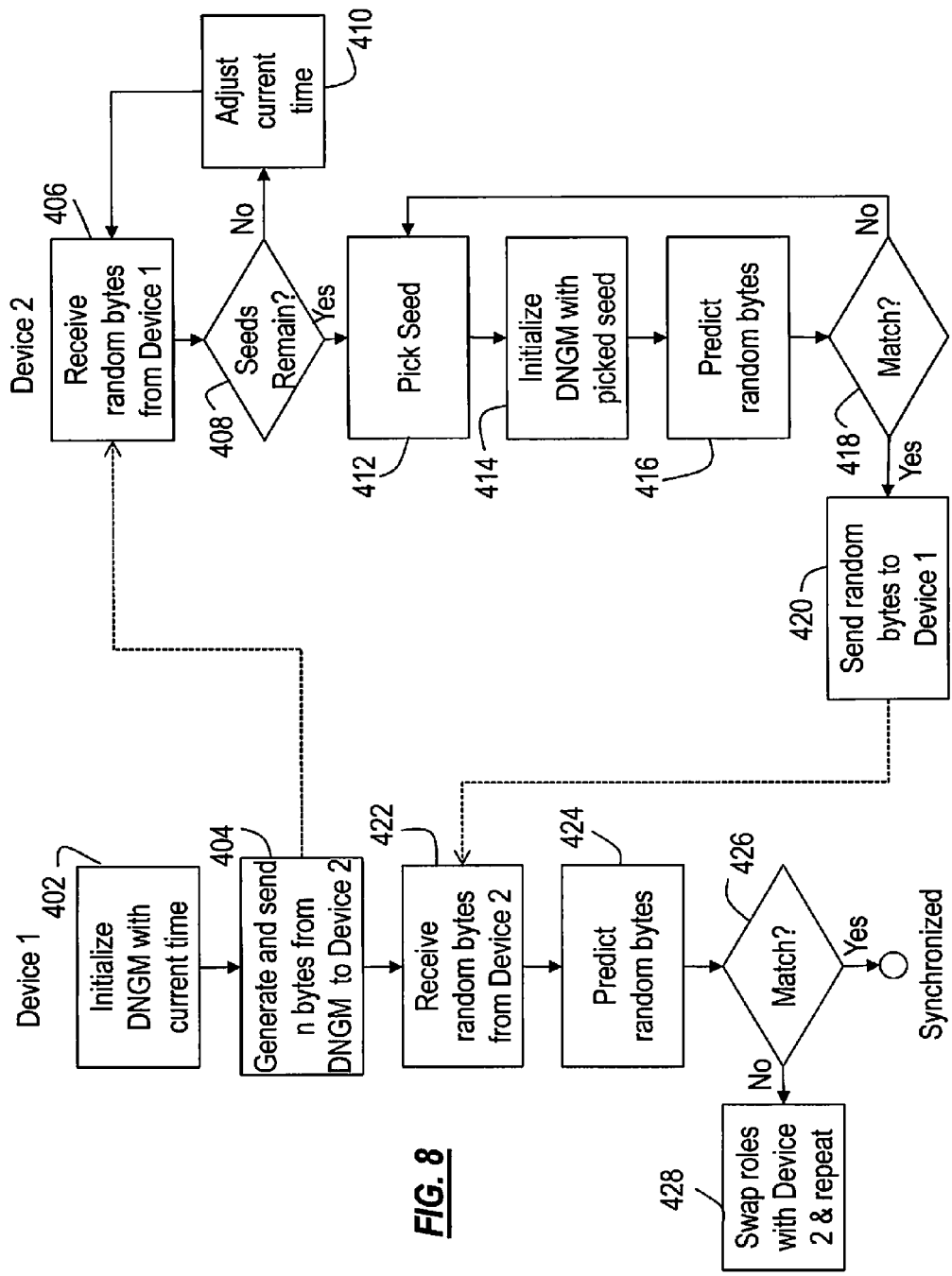
FIGS. 8-9 illustrate exemplary synchronization routines for DNGMs according to various embodiments.
Figure 9:
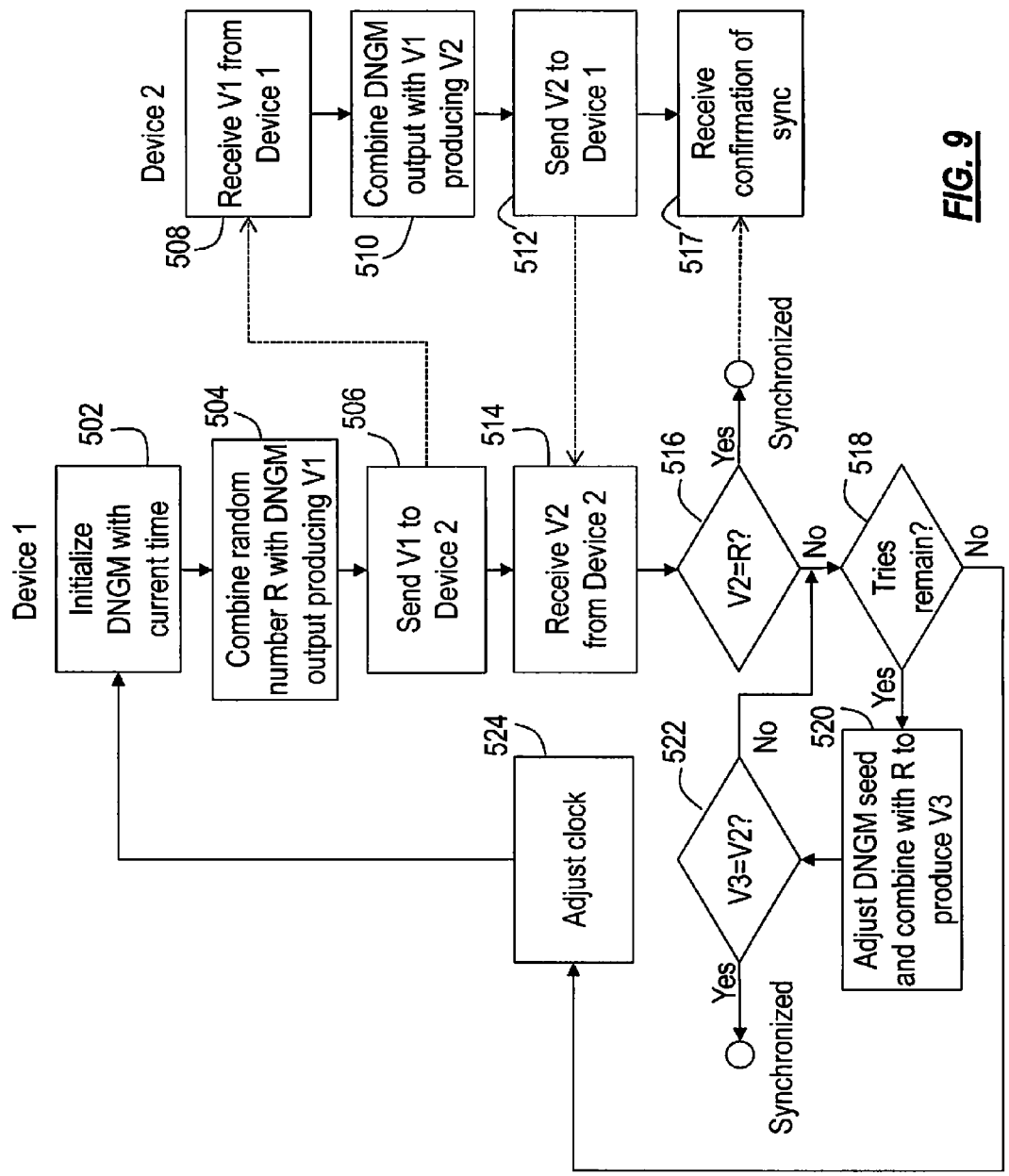

FIGS. 8-9 illustrate exemplary synchronization routines for DNGMs according to various embodiments. According to one aspect of the invention, synchronization is accomplished without having to exchange any secret information that could otherwise reveal key information to an attacker. One type of approach takes advantage of the fact that PSDs have their real-time clocks synchronized with an external source within some expected accuracy, such as 20 ms, for example. This situation provides a starting point for initializing the DNGMs that permits synchronization to be achieved relatively quickly.

Turning first to FIG. 8, an iterative approach to synchronizing the DNGMs of a first device, Device 1, and a second peer device, Device 2, is illustrated. At 402 Device 1 initializes its DNGM with the current time (or with some value derived from the current time by a known algorithm). At 404, Device 1 generates and sends a set bytes based on the output of its DNGM, e.g., 4 random bytes, to Device 2. At this point, Device 2 has its current time set to some value similar to that of Device 1. An initial range of times is defined, e.g., a 20-ms window, which corresponds generally to the expected maximum (or typical) error between the clocks of the peer devices.

At 406, Device 2 receives the output based on the DNGM of device 1. At 408 Device 2 determines if there are additional attempts at synchronizing within the current range of values. If no, the current time is adjusted to a similar time, but one just outside the current range of times at 410, and loops back to awaiting a fresh set of bytes from Device 1. If, on the other hand, there are remaining initialization values for the DNGM of Device 2, a new seed is selected for initializing Device 2's DNGM with its current time, or some variation from its current time within the present range. At 414, Device 2 initializes its DNGM with the picked seed, and at 416 generates output of its own DNGM. At 418, Device 2 compares the output if its DNGM with the bytes received from Device 1. If there is no match, the process loops back to picking a new seed based on a similar time within the present range of times.

If there is a match, at 420 Device 2 generates a new set of bytes from its own DNGM, and sends them to Device 1, which receives these new bytes at 422. Using its present time setting and DNGM initialization, at 424 Device 1 examines the output of its DNGM to predict the received bytes from Device 2. At 426, Device 1 tests for a match to confirm the synchronization. If there is no match, beginning at 428, Device 1 will attempt to synchronize with Device 2 in the same way that Device 2 attempted to synchronize with Device 1—i.e. by reinitializing its DNGM with a new time stamp and attempting to predict the random bytes it has received. In this way, Device 1 and Device 2 take turns attempting to synchronize their respective DNGMs to that of the other device. This exemplary approach allows the two DNGMs to be synchronized even if the internal clocks of the devices are farther apart than the expected error.

FIG. 9 is a diagram illustrating another approach to synchronizing the DNGMs of Device 1 and Device 2 according to another embodiment. This approach can be useful where there is a particular device lacking in processing capability to perform multiple iterations in order to synchronize itself with the other device. Separately, this approach is useful in situations where it is desirable to avoid revealing any of the generated values of the DNGMs during the synchronization process.

Accordingly, at 502, Device 1 initializes its DNGM with its current time. At 504, Device 1 combines its DNGM output with some random number R to produce value V1, e.g., {DNGM output 1} XOR {R}={V1}. At 506 Device 1 sends V1 to Device 2. At 508 Device 2 receives V1 from Device 1. At 510, Device 2 combines its own DNGM output with V1 to produce V2, e.g., {DNGM output 2} XOR {V1}=V2. At 512, Device 2 sends value V2 to Device 1. V2 at this point is either equal to random number R (this would be the case if the DNGM of Device 2 was already synchronized with the DNGM of Device 1), or is some altogether different value. The information exchanged between Device 1 and Device 2 does not reveal the value of either device's DNGM output, making it extremely computationally difficult for an attacker to determine the seeds used for initializing the DNGM, even if the attacker knows the DNGM algorithm and communication protocol.

At 514, Device 1 receives V2 and at 516 tests whether V2 equals random number R, which would indicate that synchronization is achieved. A confirmation of synchronization is sent to Device 2, encoded based on the synchronized seed of both DNGMs, which Device 2 can now receive at 517 and interpret. Otherwise, if enough tries remain, Device 1 adjusts its DNGM within a predefined range, and attempts to re-create value V2 by combining its updated DNGM output with R, producing value V3 at 520. At 522 V3 is compared against received value V2. If there is a match, the devices are synchronized. If there is no match, the process loops back to decision 518. If the permitted number of tries are exhausted, Device 1 adjusts its clock at 524 to a new value outside (but close to) the predefined range, and the process is repeated with a new iteration.

Figure 10A:
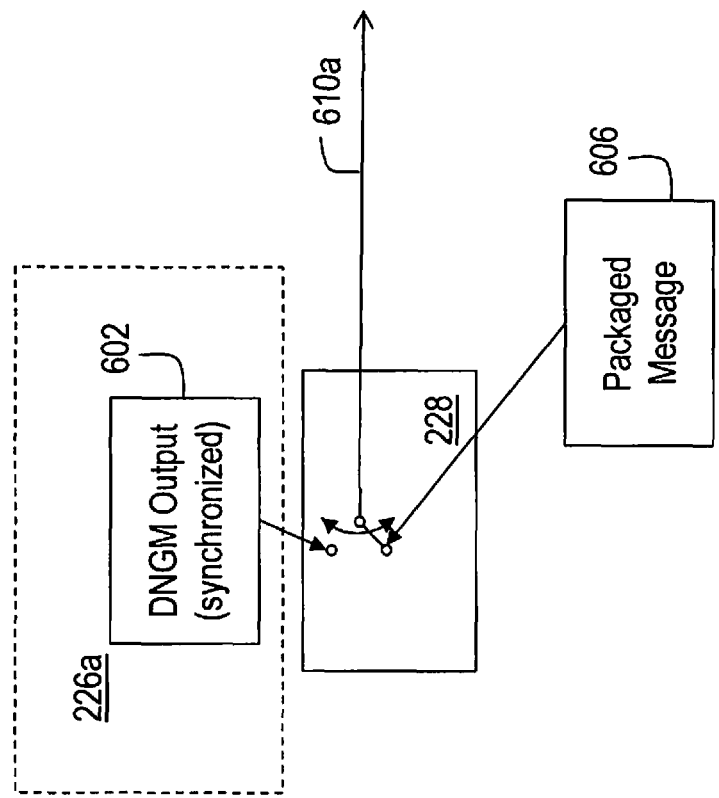
FIGS. 10A and 10B are block diagrams illustrating the operation of the chaffing process according to various embodiments.
Figure 10B:
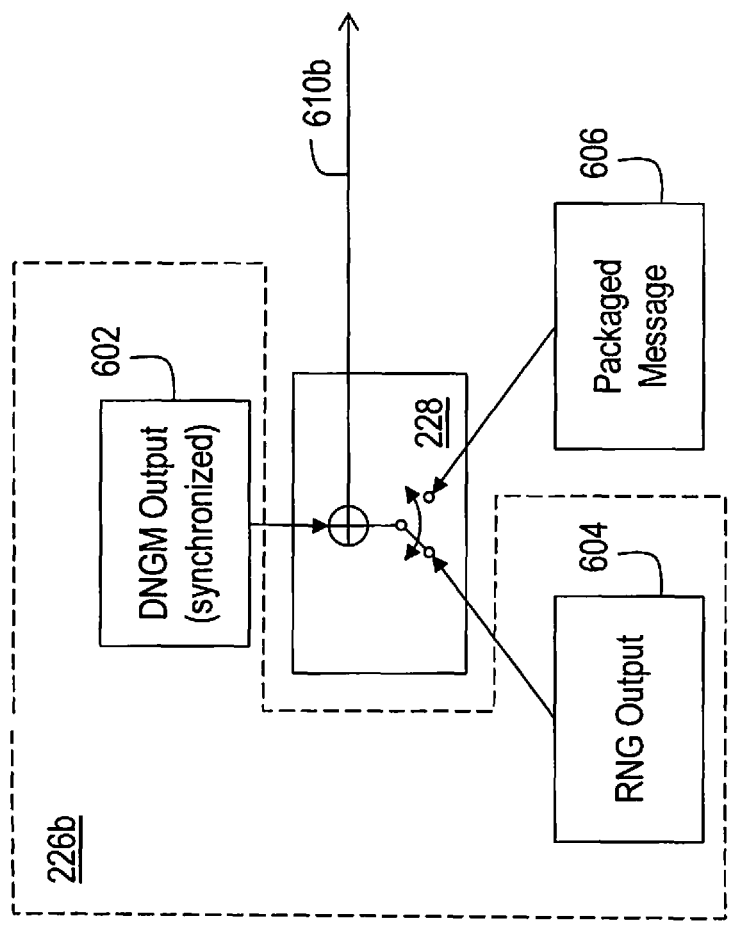

FIGS. 10A and 10B are block diagrams illustrating the operation of the chaffing process according to various embodiments. In the embodiment of FIG. 10A, the output 602 of the DNGM, which in this example is also the output of chaffing module 226a, is fed to message insertion module 228. Likewise, packaged message 606 (which is packetized, optionally encrypted based on the DNGM output, and ready for sending) is fed to message insertion module 228. Message insertion module 228 switches between the stream of chaffing data 602 and message data 606 as appropriate so as to obscure the boundaries of each message packet with an unpredictable amount of chaff in the output data 610a. Since the DNGM output is used as the chaff in this approach, the chaff is predictable by the receiver device.

In the embodiment of FIG. 10B, chaffing module 226b includes DNGM output 602, as well as an output from another data source 604, which in this example is a random number generator. In variations of this embodiment, the second data source need not be strictly random. All that is preferred is that the second data source produce a stream of data which is unpredictable to other devices. The content of the data is entirely unimportant in this approach. Its purpose is to create chaff which is unpredictable and which obscures the DNGM output so as to conceal its seed value from an attacker who knows the DNGM algorithm.

Random number generator output 604 and packaged message 606 are selectively switched in and out in turn, and one or the other is combined with the DNGM output. This process results in a message which is encoded using the DNGM output. Without a synchronized DNGM at the receiver side, the data provided in output data 610b is indiscernable.

FIG. 11A is a diagram illustrating an exemplary format of chaff and messages inserted in the chaff according to one type of embodiment. Message 700 is formed from one or more packets 700a, 700b that are interspersed with sequences of chaff bits 702, 712, and 718. As described above, the chaff can be made predictable or unpredictable. Also, each sequence of chaff can have an unpredictable length. Message 700 is packetized and includes a data payload 714, which contains the informational content of the message. The remaining fields contain message identifier and metadata to permit the receiver to parse the message and ensure its integrity. Field 704 contains a message identifier number, also referred to herein as a magic number. This is a predefined value of a predefined size (e.g., 4 bytes) that indicates the start of a message. For variable-length packets, field 706 (e.g., 4 bytes in size) contains a value indicating the amount of data in the data payload 714. As depicted, the data payload in field 714 is part of a second packet 700b, which follows the first packet 700a with chaff 712 interspersed therebetween. Offset field 708 indicates an amount of chaff in sequence 712 so that the receiver can find the beginning of second packet 700b. Cyclical redundancy check (CRC) field 710 (e.g. 16 bits in size) contains an error detection/correction code for the preceding fields 704-708. CRC field 716 likewise contains an error detection/correction code for the preceding data payload field 714. In a related embodiment, the data payload field 714 can follow immediately after the first packet portion 700a (i.e., without chaff inserted), in which case there is no longer a need for offset field 708. Also, the CRC fields 710 and 716 can be combined into a single CRC field that applies to the entire message.

In a related embodiment, the chaffing modules of sender devices that use message identifiers include a provision that discards any chaff that matches any of the message identifiers prior to providing the chaff output to the other modules. This provision avoids confusion that might be caused by a false detection of a message.

Figure 11B:
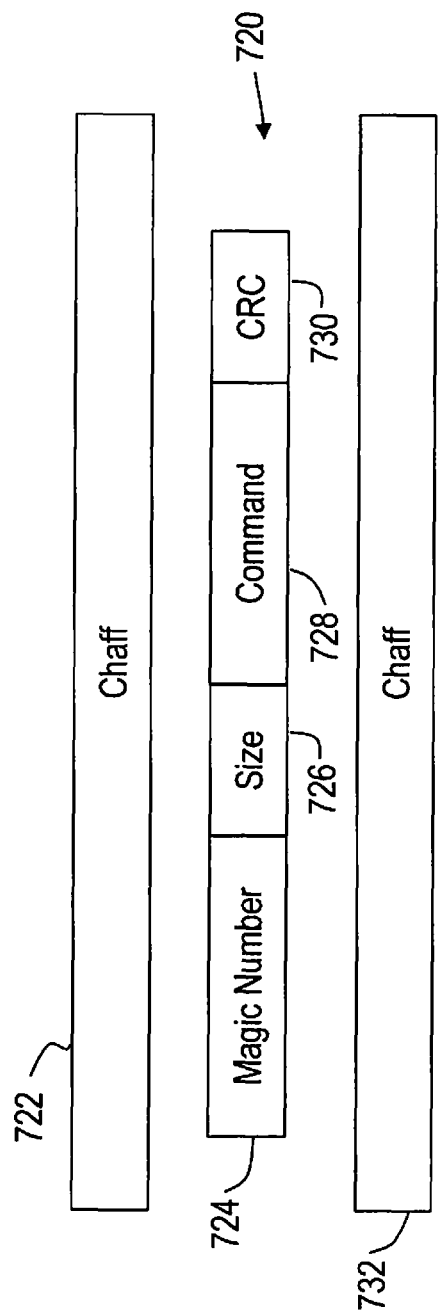
FIG. 11B illustrates a variable-length command packet according to one embodiment.

FIG. 11B illustrates a variable-length command packet 720 according to one embodiment. Command packet 720 carries instructions or other system-level control information to be handled differently by the recipient than a data packet 700. Similar to a data packet 700, command packet 720 is preceded and followed by chaff sequences 722 and 732, respectively. The fields of command packet 720 include magic number field 724, which contains a different magic number (e.g., 4 bytes in size) than data packet 700. Size field 726 is included in this example to demonstrate a variable-length packet. For fixed-length packets the size is implied by the magic number, with different magic numbers corresponding to different command packet types.

Command field 728 contains an instruction, or simply operands in some embodiments, since the magic number can also serve as the opcode of the command. In other embodiments, command field 728 contains the entire instruction. CRC field 730 contains error detection/correction code for packet 720. The instruction can include such commands as to request re-synchronization of the DNGMs, re-initialization of the DNGMs using a new seed value, an updated algorithm on selecting the seed value for re-initialization, etc.

Figure 12A:
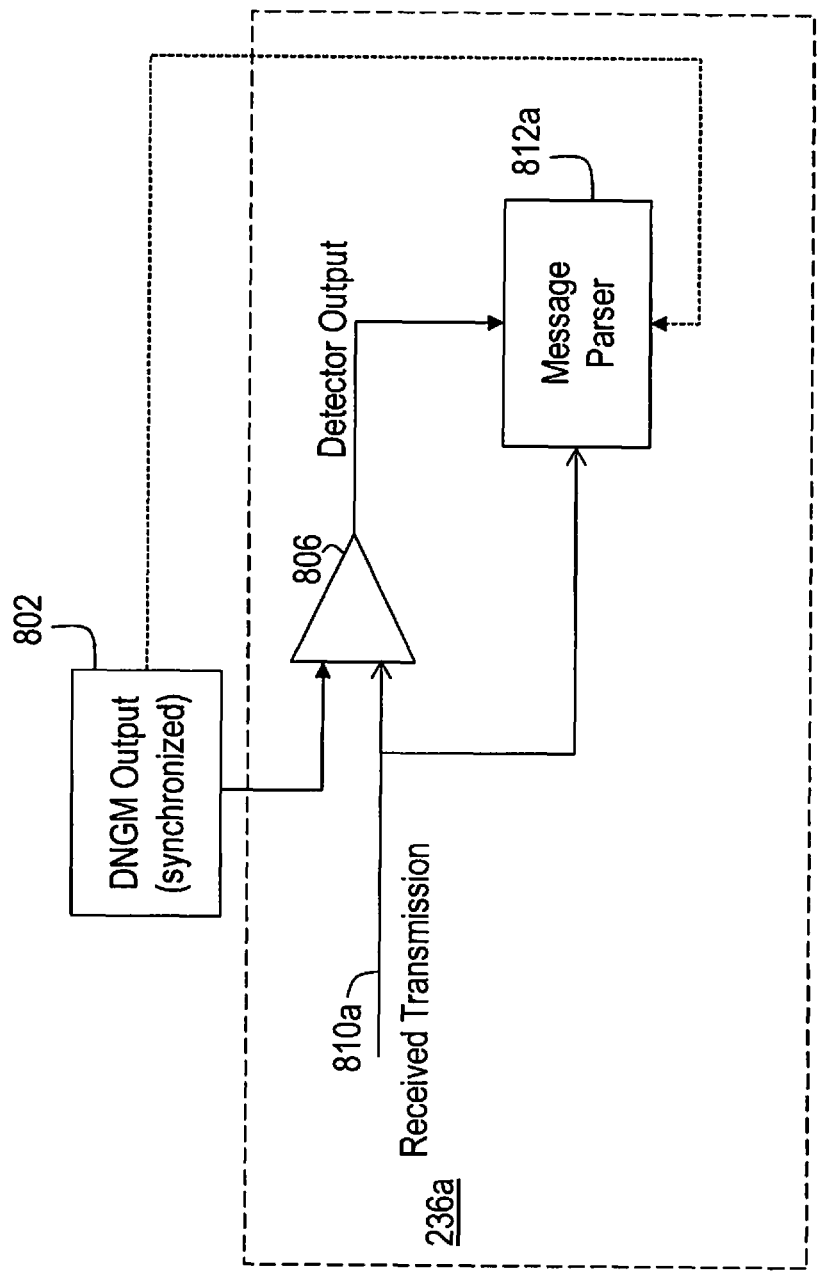
FIGS. 12A-12B illustrate exemplary winnowing module operation according to various embodiments.
Figure 12B:
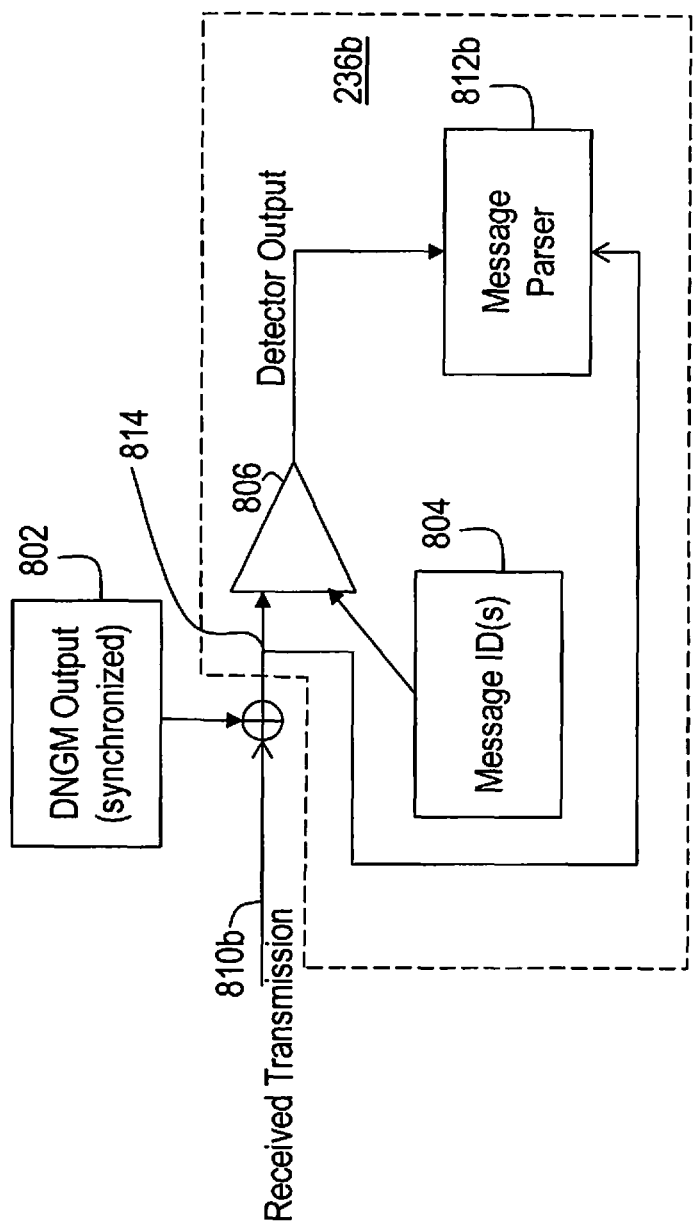

Turning now to operation of the winnower module 236, FIGS. 12A-12B illustrate its functionality according to various embodiments. FIG. 12A illustrates operation of winnowing module 236a that relies on the predictability of the chaff. Received transmission 810a contains chaff which consists of the output of the DNGM at the sender device, and message packets which may or may not be encoded. Received transmission 810a is fed to comparator 806, which compares it to the output of synchronized DNGM 802. The presence of non-chaff data suggests that the data might be a message. The detector output is fed to message parser module 812a, which enables message parser 812a to read the non-chaff data. For message packets that use message identifier numbers, such as magic numbers, message parser 812a can more readily identify messages. For embodiments in which message packets are encoded using the DNGM at the sender, the DNGM output 802 is provided to message parser 812a to be used for decoding of the message contents. Message parser 812 then verifies integrity of the message packet by performing a CRC. If the message is error-free (or fully corrected), message parser 812a extracts the message data payload based on message identifier information, packetization information such as the length, offset etc.

FIG. 12B illustrates operation of winnowing module 236b, which relies on decoding of the incoming data and recognition of messages having recognizable attributes such as message identifier numbers e.g., magic numbers. Received transmission 810 is decoded using the output of synchronized DNGM 802 to produce decoded received transmission 814. The decoded received transmission 814 is fed to comparator 806, which also receives message identifier numbers, e.g., magic numbers, 804. If there is a match between any of the message identifier numbers 804 and a string in the decoded received transmission, the comparator 806 provides a detector output that indicates the presence of a message. Message parser 812b, which also receives the decoded received transmission 814, parses the message packet based on its type (as indicated by the message identifier number, length and offset field values), and performs a CRC, extracts the message contents, etc.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art. Also, features can be combined or separated into distinct structures, functions, modules, etc. For instance, the chaffing module examples described above can include within their functionality one or more DNGMs.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A communication apparatus for sending messages over a communication medium and to conceal the messages among chaff data, the apparatus comprising:
   an input circuit adapted to obtain a first message that is to be transmitted;
   a communication circuit adapted to send outgoing communications and receive incoming communications data over one or more channels through the communication medium, respectively, to and from a remote device;
   a chaffing module adapted to generate a stream of chaffing data;
   a message insertion module operatively coupled to the input circuit, the chaffing module, and the communication circuit, and configured to insert the first message into the stream of chaffing data such that the beginning and ending boundaries of the first message are concealed by the chaffing data;
   a first deterministic number generator module (DNGM) adapted to generate different sequences of numbers based on different initialization values such that, in response to each initialization value, a certain sequence of numbers is repeatably generated;
   a DNGM initialization module operatively coupled to the communication circuit and to the first DNGM, and adapted to exchange initialization data via the communication circuit with the remote device to establish a common initialization value between the first DNGM and a second DNGM of the remote device to thereby cause the first DNGM and second DNGM to generate a common sequence of numbers; and
   wherein at least one of the stream of chaffing data and data associated with the first message is encoded using an output of the first DNGM when the first DNGM is and the second DNGM are generating the common sequence of numbers.

2. The apparatus of claim 1, wherein the apparatus is incorporated as part of a communication circuit of a power system device.

3. The apparatus of claim 1, further comprising:
   a housing; and
   wherein the input circuit includes a communication port adapted to interface with a communication port of a power system device.

4. The apparatus of claim 1, wherein the first DNGM is configured to act as the chaffing module.

5. The apparatus of claim 1, wherein the first DNGM includes a pseudo-random number generator (PRNG).

6. The apparatus of claim 1, wherein the stream of chaffing data is generated based on an output of the first DNGM such that the chaffing data is predictable.

7. The apparatus of claim 1, wherein the data of the stream of chaffing data is unpredictable.

8. The apparatus of claim 1, wherein the data associated with the first message includes a message identifier number indicative of a presence of a message.

9. The apparatus of claim 8, wherein the message identifier number is a message type identifier number corresponding to one of a plurality of message types, wherein each of the plurality of message types has a different corresponding message type identifier number.

10. The apparatus of claim 9, wherein the message identifier number is indicative of an action to be performed by the remote device.

11. The apparatus of claim 1, further comprising:
    a packet forming module operatively coupled to the input and the first DNGM, and adapted to form message packets based on the message data obtained via the input circuit, each message packet including a message identifier.

12. The apparatus of claim 1, further comprising:
    a clock that maintains a current time; and
    wherein the initialization value is based on the current time.

13. The apparatus of claim 1, wherein the initialization value is based on a previously communicated value between the communication apparatus and the remote device.

14. The apparatus of claim 1, wherein initialization data is encoded with an output of the first DNGM.

15. The apparatus of claim 1, wherein only the stream of chaffing data is encoded based on the output of the first DNGM.

16. The apparatus of claim 1, wherein only the data associated with the first message is encoded based on the output of the first DNGM.

17. The apparatus of claim 1, wherein as a result of establishment of the common initialization value, the first DNGM and the second DNGM both generate a common sequence of numbers contemporaneously.

18. The apparatus of claim 1, wherein as a result of establishment of the common initialization value, the first DNGM and the second DNGM each obtains a capability to identify a DNGM sequence of numbers generated by the other DNGM in the past, present, or future.

19. The apparatus of claim 1, further comprising:
    are-initialization module operatively coupled to the first DNGM, and adapted to update the initialization value of the first DNGM based on at least one item of information known to both the communication apparatus and the remote device.

20. The apparatus of claim 1, further comprising:
    a winnower module operatively coupled to the communication circuit and to the first DNGM, the winnower module adapted to distinguish between chaffing data and message data contained in the incoming communications data, by determining the beginning and ending boundaries of the message data contained in the incoming communications data based on detecting at least one of a stream of chaffing data and data associated with each message in the incoming communications data using an output of the first DNGM when the first DNGM is and the second DNGM are generating the common sequence of numbers; and
    an output circuit adapted to provide the message data in the incoming communications to a message consumer circuit.

21. A communication apparatus for receiving, over a communication medium, messages that are concealed among chaff data, the apparatus comprising:
    a communication circuit adapted to send outgoing communications and receive incoming communications data over one or more channels through the communication medium, respectively, to and from a remote device, wherein the incoming communications data comprises a stream of chaffing data and a first message inserted therein such that the beginning and ending boundaries of the first message are concealed by the chaffing data;

a first deterministic number generator module (DNGM) adapted to generate different sequences of numbers based on different initialization values such that, in response to each initialization value, a certain sequence of numbers is repeatably generated;

a DNGM initialization module operatively coupled to the communication circuit and to the first DNGM, and adapted to exchange initialization data via the communication circuit with the remote device to establish a common initialization value between the first DNGM and a second DNGM of the remote device to thereby cause the first DNGM and second DNGM to generate a common sequence of numbers;

a winnower module operatively coupled to the communication circuit and to the first DNGM, the winnower module adapted to distinguish between chaffing data and message data in the incoming communications data, by determining the beginning and ending boundaries of the first message based on detecting at least one of the stream of chaffing data and data associated with the first message in the incoming communications data using an output of the first DNGM when the first DNGM is and the second DNGM are generating the common sequence of numbers; and an output circuit adapted to provide the decoded first message to a message consumer circuit.

22. The apparatus of claim 21, wherein the winnower module is adapted to determine the beginning and ending boundaries of the first message based on detecting only the stream of chaffing data, including comparing the stream of chaffing data in the incoming communications data with an output of the first DNGM and responding to an indication of non-matching data as a result of the comparing by parsing the non-matching data as a potential message.

23. The apparatus of claim 21, wherein the winnower module is adapted to determine the beginning and ending boundaries of the first message based on decoding the incoming communications data with an output of the first DNGM to produce a decoded received set of data, and to check the decoded received set of data for a presence of the data associated with the first message and, in response to a detection of the presence of the data associated with the first message, to parse data adjacent to the data associated with the first message as a potential message.

24. The apparatus of claim 21, wherein the apparatus is incorporated as part of a communication circuit of a power system device.

25. The apparatus of claim 21, further comprising:
a housing; and
wherein the input circuit includes a communication port adapted to interface with a communication port of a power system device.

26. The apparatus of claim 21, wherein the first DNGM includes a pseudo-random number generator (PRNG).

27. The apparatus of claim 21, wherein the stream of chaffing data is predictable based on an output of the first DNGM.

28. The apparatus of claim 21, wherein the data of the stream of chaffing data is unpredictable.

29. The apparatus of claim 21, wherein the data associated with the first message includes a message identifier number indicative of a presence of a message.

30. The apparatus of claim 29, wherein the message identifier number is a message type identifier number corresponding to one of a plurality of message types, wherein each of the plurality of message types has a different corresponding message type identifier number.

31. The apparatus of claim 29, wherein the message identifier number is indicative of an action to be performed by the remote device.

32. The apparatus of claim 21, further comprising:
a clock that maintains a current time; and
wherein the initialization value is based on the current time.

33. The apparatus of claim 21, wherein the initialization value is based on a previously communicated value between the communication apparatus and the remote device.

34. The apparatus of claim 21, wherein initialization data is encoded with an output of the firstDNGM.

35. The apparatus of claim 21, wherein as a result of establishment of the common initialization value, the first DNGM and the second DNGM both generate a common sequence of numbers contemporaneously.

36. The apparatus of claim 21, wherein as a result of establishment of the common initialization value, the first DNGM and the second DNGM each obtains a capability to identify a DNGM sequence of numbers generated by the other DNGM in the past, present, or future.

37. The apparatus of claim 21, further comprising:
are-initialization module operatively coupled to the first DNGM, and adapted to update the initialization value of the first DNGM based on at least one item of information known to both the communication apparatus and the remote device.

38. A method for sending messages, by a communication device, over a communication medium while concealing the messages among chaff data, the method comprising:
obtaining a first message that is to be transmitted;
sending outgoing communications over one or more channels through the communication medium to and from a remote device;
generating a stream of chaffing data;
inserting the first message into the stream of chaffing data such that the beginning and ending boundaries of the first message are concealed by the chaffing data;
generating different sequences of numbers based on different initialization values such that, in response to each initialization value, a certain sequence of numbers is repeatably generated;
exchanging initialization data with the remote device to establish a common initialization value with the remote device to thereby cause generation of a common sequence of numbers with the remote device; and
encoding at least one of the stream of chaffing data and data associated with the first message the common sequence of numbers.

39. The method of claim 38, wherein generating the common stream of chaffing data includes generating chaffing data that is predictable.

40. The method of claim 38, wherein generating the common stream of chaffing data includes generating chaffing data that is unpredictable.

41. The method of claim 38, further comprising:
providing the data associated with the first message to include a message identifier number indicative of a presence of a message.

42. The method of claim 41, wherein providing the data associated with the first message such that the message identifier number is a message type identifier number corresponding to one of a plurality of message types, wherein each of the plurality of message types has a different corresponding message type identifier number.

43. The apparatus of claim 41, wherein the message identifier number is indicative of an action to be performed by the remote device.

44. The method of claim 38, further comprising:
forming message packets based on the message data, each message packet including a message identifier.

45. The method of claim 38, further comprising:
maintaining a current time; and
basing the initialization value on the current time.

46. The method of claim 38, further comprising:
updating the initialization value based on a previously communicated value with the remote device.

47. The method of claim 38, further comprising:
updating the initialization value based on at least one item of information known by the remote device.

48. The method of claim 38, further comprising:
distinguishing between chaffing data and message data contained in the incoming communications data, by determining the beginning and ending boundaries of the message data contained in the incoming communications data based on detecting at least one of a stream of chaffing data and data associated with each message in the incoming communications data using the common sequence of numbers; and
providing the decoded first message to a message consumer circuit.

* * * * *